United States Patent
Smith et al.

(10) Patent No.: US 7,376,515 B2
(45) Date of Patent: May 20, 2008

(54) SYSTEM AND METHOD FOR CSEM EXPLORATION IN POLAR REGIONS

(75) Inventors: Michael Joseph Smith, Wimbledon (GB); Bryan David Ritchie, Twickenham (GB); Leon Thomsen, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 11/482,348

(22) Filed: Jul. 7, 2006

(65) Prior Publication Data

US 2008/0008035 A1 Jan. 10, 2008

Related U.S. Application Data

(60) Provisional application No. 60/697,206, filed on Jul. 7, 2005.

(51) Int. Cl.
*G01V 3/12* (2006.01)
(52) U.S. Cl. .......................................................... 702/7
(58) Field of Classification Search ................... 702/2, 702/6, 7, 14
See application file for complete search history.

(56) References Cited

U.S. PATENT DOCUMENTS

| | | | |
|---|---|---|---|
| 3,828,245 A | | 8/1974 | Unterberger |
| 4,139,074 A | * | 2/1979 | White .......................... 181/120 |
| 4,372,420 A | * | 2/1983 | White .......................... 181/120 |
| 4,616,348 A | * | 10/1986 | Ostrander ..................... 367/21 |
| 4,621,347 A | * | 11/1986 | Ostrander ..................... 367/21 |
| 6,188,221 B1 | * | 2/2001 | Van de Kop et al. ....... 324/337 |
| 6,914,433 B2 | | 7/2005 | Wright et al. |
| 6,975,121 B2 | | 12/2005 | Strack et al. |

(Continued)

FOREIGN PATENT DOCUMENTS

| | | |
|---|---|---|
| GB | 2232315 A | 12/1990 |
| WO | WO 00/08490 | 2/2000 |
| WO | WO 2005/006022 A1 | 1/2005 |

OTHER PUBLICATIONS

Seth Storey Haines, Seismoelectric Imaging of Shallow Targets, Dec. 2004, pp. 1-179, Publisher: Stanford University, Published in: US.

(Continued)

*Primary Examiner*—Donald E McElheny, Jr.
(74) *Attorney, Agent, or Firm*—Fellers, Snider, Blankenship, Bailey & Tippens, P.C.; Terry L. Watt

(57) ABSTRACT

There is provided herein a system and method of collecting EM data in the context(s) of hydrocarbon exploration, appraisal, development, and surveillance, which provides improved ground coupling between the electrodes and the earth or surface ice and, as a consequence, a higher quality transmitted and received signal is obtained thereby. Where the surface of the ground is saturated and frozen (e.g., in the case of a survey conducted on sea ice or frozen tundra), the survey instruments (sources and receivers) may be coupled more faithfully to the surface by drilling or melting holes into the ice (or frozen tundra) and inserting electrodes into the resulting holes. Each hole may (or may not) be lined with material to retard the loss of water therefrom. Preferably, each of the holes (source and receiver) will be filled with water (fresh or salt) before data collection begins.

9 Claims, 3 Drawing Sheets

U.S. PATENT DOCUMENTS

| | | |
|---|---|---|
| 2004/0232917 A1 | 11/2004 | Wright et al. |
| 2005/0264294 A1 | 12/2005 | Constable |
| 2005/0264295 A1 | 12/2005 | Strack et al. |
| 2006/0262645 A1* | 11/2006 | Van Baaren .................. 367/54 |

OTHER PUBLICATIONS

Edwards, et al., The Ice-Moses Experiment: Mapping Permafrost Zones Electrically beneath the Beaufort Sea, 1988, pp. 265-290, vol. 9, Publisher: Marine Geophysical Researches, Published in: US.

Chave, Alan D., et al., Controlled Electromagnetic Sources for Measuring Electrical Conductivity Beneath the Oceans, 1982, pp. 5327-5338, vol. 87, Publisher: J. Geophys. Res.,, Published in: US.

Eidesmo, T., et al., Sea Bed Logging (SBL), a new method for remote and direct identification of hydrocarbon filled layers in deepwater areas, Mar. 2002, pp. 142-152, vol. 20, No. 3, Publisher: First Break, Published in: US.

* cited by examiner

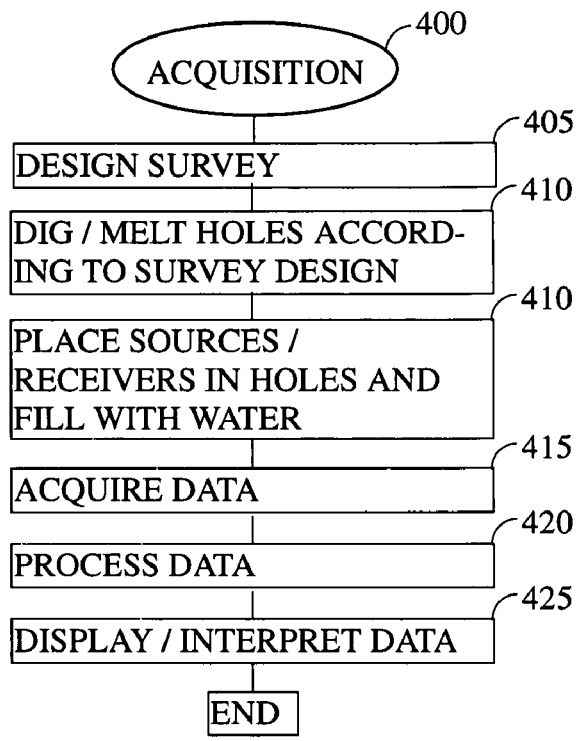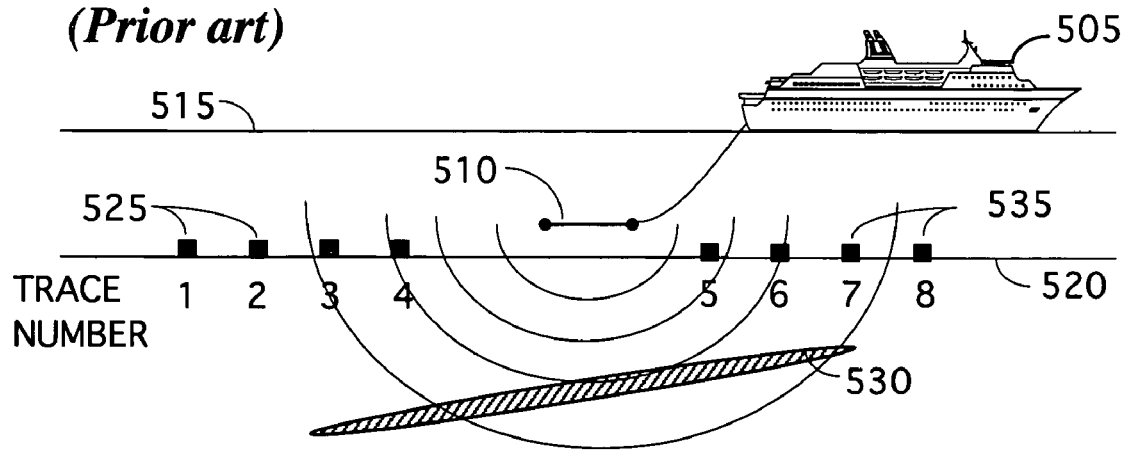

SYSTEM AND METHOD FOR CSEM EXPLORATION IN POLAR REGIONS

TECHNICAL FIELD

This invention relates to the general subject of geophysical exploration for hydrocarbons and, in particular, to methods for collecting and analyzing controlled source electromagnetic ("CSEM", hereinafter) earth survey data, with particular reference to polar regions of the earth.

BACKGROUND OF THE INVENTION

Measurements of subsurface electrical resistivity have long been used to differentiate rock layers that contain hydrocarbons from other rock units that do not contain hydrocarbons. For example, resistivity well logs have been routinely used for many years to identify producing intervals within existing well bores. However, more recently, it has been found feasible to use surface surveys, which do not require that a well be drilled, in order to detect subsurface hydrocarbon deposits. That is, information collected on the surface is used to determine the subsurface resistivity distribution in the subsurface—in a non-invasive fashion—beneath a line of receivers, the resistivity being indicative of the presence or absence of such deposits. The ability to detect hydrocarbon deposits from the earth's surface, through electromagnetic methods, is of most interest for purposes of the instant disclosure.

Generally speaking, the subsurface has relatively few large contrast resistivity boundaries. However, rocks units that contain hydrocarbons tend to show a large resistivity contrast in comparison with the rocks that enclose them and, as a consequence, resistivity-based methods have long been viewed as potential direct hydrocarbon indicators. For example, the resistivity of a hydrocarbon bearing formation could be on the order of a few tens of Ohm-m or higher, as compared with the resistivity of the over- and under-lying water-saturated sediments, which have resistivity on the order of 2 Ohm-m or less. Thus, when hydrocarbons are present in the subsurface, resistivity-based methods can potentially be used to detect them when other geophysical methods would not. As a consequence, there is currently a great deal of interest in using electromagnetic ("EM") methods to locate new sources of trapped hydrocarbons, monitor the hydrocarbon distribution within an existing reservoir (e.g., reservoir monitoring over time), etc.

Although there are a number of EM survey variants, of particular interest for purposes of the instant disclosure are surveys that utilize a "controlled source" (i.e., controlled source electromagnetic measurements, or "CSEM", hereinafter), as opposed to those that utilize a natural source ("magnetotelluric" surveys). CSEM surveys are conducted in both marine and onshore environments. In a marine environment, the survey is typically conducted with a boat pulling a horizontally disposed electric dipole source, near the sea bottom, above a set of sea bottom receivers. The source is powered by an electrical generator that is situated on the boat. The source will usually be programmed to create a low frequency (or other programmed variation) electromagnetic signal by varying the voltage that is supplied to the electric dipole.

In the case of land surveys, a series of source and receiver electrodes are laid out on the surface of the earth. In some instances, the electrodes are mounted on metal spikes so that they can be pushed into the earth, thereby improving their coupling to the ground. Those of ordinary skill in the art will recognize that local conditions of soil conductivity are crucially important to the quality of this coupling.

The CSEM techniques described below are understood to yield low-resolution, but direct indications, of the presence of hydrocarbons. By contrast, seismic exploration techniques yield higher-resolution images of the subsurface layering, but only indirect indications of the presence of hydrocarbons. A combination of these two types of surveys can be a powerful method of exploration.

Although CSEM surveys come in many forms, such surveys may utilize, as a signal source, a time-varying electrical current that is introduced into the subsurface through electrodes or lines of contact at the surface, making a grounded-dipole source. The electrodes might either be placed in direct contact with the surface of the earth (e.g., in a land survey) or towed behind a boat through the water (e.g., in a marine survey). Such grounded dipoles produce propagating electromagnetic fields which are sensitive to resistive anomalies in the subsurface, and hence may be associated with hydrocarbons. Alternatively, the sources might be current loops, which inductively produce propagating electromagnetic fields; however these are sensitive to conductive anomalies, rather than to resistive anomalies, and hence are more useful in the context of mineral exploration and less so in the petroleum context.

In a conventional CSEM survey, receivers are positioned on the earth's surface—to include receivers positioned on the ocean bottom—which are designed to measure the electric and/or magnetic fields that are induced by the source. These measurements are used to estimate the effective or apparent resistivity of the subsurface beneath the receivers, according to methods well known to those of ordinary skill in the art. Note that, depending on the signal source and survey design, the receivers might be situated at distances from zero to 20 kilometers away from the source. In general, longer offsets are required in order to investigate deeper into the earth.

As the source is activated in the vicinity of the receivers, electromagnetic energy propagates from source to receiver, via a variety of paths, and the variations in the amplitude and phase of these fields are detected and recorded by each of the receivers. Various processing algorithms are then used to estimate the resistivity structure of the subsurface beneath the survey.

In some variations, alternating currents are employed as the signal source, with the polarity of such current being reversed at a selected frequency. Any such surveying, with continuous source operating at one or a few selected frequencies (including harmonics) may be called frequency-domain controlled source electromagnetic surveying (f-CSEM). f-CSEM techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68, the disclosure of which is incorporated by reference herein as if fully set out at this point.

In the marine context, the most common CSEM acquisition methods all use frequency-domain techniques and, more particularly, they use a continuous source signature that operates at one or a few discrete frequencies; Srnka (U.S. Pat. No. 6,603,313, the disclosure of which is incorporated herein by reference) is a good example, citing several other recent patents and publications sharing this same class of techniques.

Another controlled source technique for electromagnetic surveying may be called transient (or time-domain) controlled source electromagnetic surveying, referred to as "t-CSEM" hereinafter. In t-CSEM, an electrode is used to create an electric current in the same general manner as was discussed previously in connection with f-CSEM, except that the source is impulsive (or of short duration), rather than continuous. For example, the electrode may be charged using a DC (i.e., "direct current") source, which, after some time, is then shut off, causing an abrupt termination of current. Data is then collected from the receivers during the extended time interval that the current is inactive. Of course, such data display a general decay in the measured voltages as time progresses subsequent to the source shut-off. Note that this is in contrast to f-CSEM methods which collect data from the receivers while the source is active. The time variation of the t-CSEM voltages that are observed after the termination of the source current is used to infer the resistivity structure of the subsurface. T-CSEM techniques are described, for example, in Strack, K.-M., 1992, *Exploration with deep transient electromagnetics*, Elsevier, 373 pp. (reprinted 1999), the disclosure of which is incorporated herein by reference as if fully set out at this point. For the most part, t-CSEM techniques have traditionally been used in connection with land surveys (see Everett, M. E., Benavides, A., and Pierce, C. J., 2005, *An experimental study of the time-domain electromagnetic response of a buried conductive plate*, Geophysics 70(1), G1, for an application in the context of exploration for unexploded ordinance).

On land, CSEM acquisition techniques are generally well established (cf., e.g., the textbook by Strack, K. M., *Exploration with Deep Transient Electromagnetics*, Elsevier, 1999). However, land application of CSEM in the hydrocarbon context has been hampered heretofore by difficulties in survey execution, caused by variable coupling of the sources and receivers to the ground. In the most common application, both sources and receivers are attached to the ground via electrodes, which penetrate the ground as far as is practicable. However, the properties of the ground in the vicinity of the electrodes (e.g., variable soil conditions, water saturation, etc.), especially the source electrodes, affects the coupling to the deeper subsurface, so that, if the coupling is not good, the resulting data is weak and variable, and the subsurface signal is compromised. In particular, the strong and variable mismatch in electrical impedance (between the instruments, the near-by ground, and the deep subsurface) contributes strongly to these acquisition difficulties. (By contrast, in marine CSEM, there is no coupling problem, since sources and receivers are intimately and uniformly coupled to the ocean bottom via seawater.)

Because of this ground-coupling problem, the success of land CSEM techniques has been variable, and they have not historically been proven to be broadly useful for hydrocarbon exploration. However, recently attempts to provide commercial services have been launched; these services have been restricted to the conventional oil basins of temperate and tropical latitudes.

Exploration for hydrocarbons in the Polar regions of the earth is hindered by a myriad of practical difficulties associated with the cold temperatures: men and equipment simply do not function well in such environments. In particular, offshore the floating pack ice makes conventional seismic exploration infeasible, and onshore the surface conditions severely discourage the application of proven methods of exploration. Under these conditions, practitioners have not even attempted to apply CSEM exploration methods, which have proven to be unreliable in less harsh conditions, to these more difficult polar environments.

Heretofore, as is well known in the geophysical prospecting and interpretation arts, there has been a need for a method of using CSEM techniques to obtain a resistivity image of the subsurface that does not suffer from the limitations of the prior art. Accordingly, it should now be recognized, as was recognized by the present inventors, that there exists, and has existed for some time, a very real need for a method of geophysical prospecting that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided a system and method of collecting CSEM data (and especially t-CSEM data), which permits effective exploration, appraisal, development, and surveillance of hydrocarbon reservoirs in polar regions by providing improved ground coupling between the electrodes, the surficial ice, the sub-ice water, and hence, to the earth itself. As a consequence, a higher quality transmitted and received signal is obtained, and through the use of the methods taught herein, CSEM becomes feasible for use in hydrocarbon detection in such regions.

According to a first preferred embodiment, the instant invention utilizes time-domain Controlled-Source Electromagnetic surveys ("t-CSEM") that are taken on ice or on land in regions covered by ice or snow. Through the use of this technology, such EM surveying may be carried out, for example, on the frozen surface of the Arctic Ocean, or the frozen forests of Siberia or the polar archipelago of Canada, opening these areas (which are notoriously difficult in which to acquire good survey data of any type) to effective exploration and exploitation of their hydrocarbon resources.

By way of summary, the present inventors have discovered that, where the surface of the ground is saturated and frozen (such as in the case of a survey conducted on sea ice, or frozen tundra), the instruments (sources and receivers) may be coupled more faithfully to the subsurface by drilling or melting holes in the ice (or frozen tundra) by any of a number of methods, and inserting electrodes into the resulting holes. If on floating ice, the holes should preferably be drilled through the ice into the water below. If on land, the holes may (or may not) be lined with material to retard the loss of water therefrom. Upon filling the holes with water (frozen or not, freshwater or salt water, etc.), and connecting the immersed electrodes to the recording instruments, the resulting coupling is virtually as good as it would be in the case of marine t-CSEM survey, and the land data collected via this approach will likely be of equivalent quality. Ice is generally a poor conductor, but it is of uniform quality (from point to point in the survey), and so its lack of conductivity may be somewhat compensated for, in survey design (e.g., in source strength, source electrode-array design, source electrode-material, etc.).

After the source electrodes are in position within their holes, electrical energy is injected into the ice or other surface via those electrodes. The signal will then be received (via surface and subsurface propagation paths) at receiver electrodes similarly implanted at a range of distances from the source. Alternatively, the receivers could be of different design, e.g., current loops, measuring magnetic fields directly, and electric fields by inductance.

Note that this approach makes it possible for the first time to collect high quality EM data in a marine setting by using modified land techniques. That is, one aspect of the instant invention involves conducting a CSEM survey on the pack ice floating on water (fresh- or salt-water). Obviously, if the weather were warmer, and the ice were melted, a conventional or unconventional marine survey could be conducted (e.g., as is generally indicated in FIG. 5). However, in polar regions the season of open water is short or absent, so that these marine techniques have limited applicability. However, when the body of water (or at least a portion of it) freezes over, a land-style survey may be conducted instead on the resulting ice layer. In the case of marine surface ice, the electrode holes may easily penetrate the floating ice, reaching the unfrozen seawater below (which has excellent conductivity), and avoiding altogether those problems caused by the poor conductivity of ice. In this marine case, the data are analyzed by means described elsewhere, perhaps taking special steps to account for reflection from the seafloor.

In another variation, there is provided a method of EM exploration in polar regions that may be covered by tundra, or by swamps, or by wide shallow rivers which are ecologically fragile, particularly during warmer seasons. Those of ordinary skill in the art will recognize that the only practical time to enter such areas with men and equipment is during the colder seasons, when the surface is stabilized by ice and snow-cover. During that season seismic exploration is feasible, but logistically difficult, because the cold weather causes mechanical devices (e.g. vibrators) to fail more often than in warmer weather. Further, obtaining high quality coupling of seismic geophones to the ground during this time is problematic. Also, seismic sampling requirements are more stringent than are EM sampling requirements (since the seismic wavelengths are shorter than the EM wavelengths, in typical practice), so that many more source-locations and receiver-locations are required for seismic surveying than for CSEM surveying. According to the instant invention there is provided a CSEM surveying method substantially as described above, but wherein the ground coupling is improved by digging or drilling holes into the tundra or ice into which the electrodes are thereafter placed. Note that through the use of the present invention, CSEM in such environments can serve to identify areas that are likely to contain hydrocarbons in the subsurface, making it possible to high-grade those particular areas for subsequent seismic surveys that are more suitable for obtaining high-resolution seismic images of those reservoirs.

In another variation, in a survey conducted on ice or snow, magnetic energy is injected into the ice, via current loops deployed over the ice, and received (via surface and sub-surface propagation paths) at current loops similarly deployed, at a range of distances from the sources. This sort of survey is particularly useful at finding conductive anomalies, rather than resistive anomalies (hydrocarbons). Nevertheless, the present invention can be utilized to conduct such a conventional land-based magnetic survey on top of floating ice during cold weather. Compared to conventional marine CSEM surveying (with sources and receivers near the sea-floor), a marine survey conducted as described above requires that the EM energy signal from the subsurface propagates additionally through the water layer, twice (down and up). This means that the current invention will be more useful in shallow waters than in deep waters, although with sufficiently powerful sources and sufficiently sensitive receivers, the depths can be extended. Modeling shows that sea-water of 100 m depth causes no serious problems.

In summary, the present inventors have discovered that a critical feature of the marine environment, which makes conventional CSEM practical in that setting, is the intimate and uniform coupling of sources and receivers to the medium (seawater). Those skilled in the art of marine CSEM will realize that deep water (relative to target depth) is also important to the practicality of f-CSEM, but that this restriction does not apply to t-CSEM. As is disclosed herein, the present inventors have realized that this coupling-principle can also be realized in polar environments, because of the ubiquity in such environments of ice and snow. This is a key aspect of the present invention, i.e., the realization that according to the techniques taught herein ice provides for good coupling in polar environments in the same fashion as water provides same in marine environments, thereby making it possible to collect high quality CSEM data. In particular, the techniques taught herein enable the collection of high-quality, CSEM data, suitable for exploration for the deep resistivity anomalies characteristic of hydrocarbon reservoirs.

Although others have conducted land EM surveys in regions with permafrost (e.g., in Prudhoe Bay to examine the depth of the permafrost at depths up to 300 m, and in Siberia, using offsets up to 2 km, to look for Induced Polarization effects, at depths to 2 km, associated with hydrocarbon reservoirs situated deeper), it is a testimony to the novelty of the present invention that these practitioners, operating in such a closely related arena, failed to conceive of this invention.

Finally, it should be noted and remembered that when the terms "artic", "polar regions", etc., are used herein those terms should be understood in their broadest sense to indicate that the preferred operating environment for the instant invention includes land or marine regions covered with ice and snow permanently or temporarily, as well as regions with frozen surface soil (e.g., permafrost), and thus would also include mountainous regions, as well as regions of high latitude. With that said, it is also clear that, since ice is resistive, the techniques disclosed herein would be best applied where the sections of ice or fresh water are relatively thin, i.e., the ideal environment for application of the instant invention is one of floating ice above salt water (although as noted above, other "polar" environments are also feasible).

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 4 illustrates a preferred t-CSEM operating logic.

FIG. 5 contains a schematic illustration of a prior art approach to conducting a marine EM survey.

DETAILED DESCRIPTION

Figure 1:
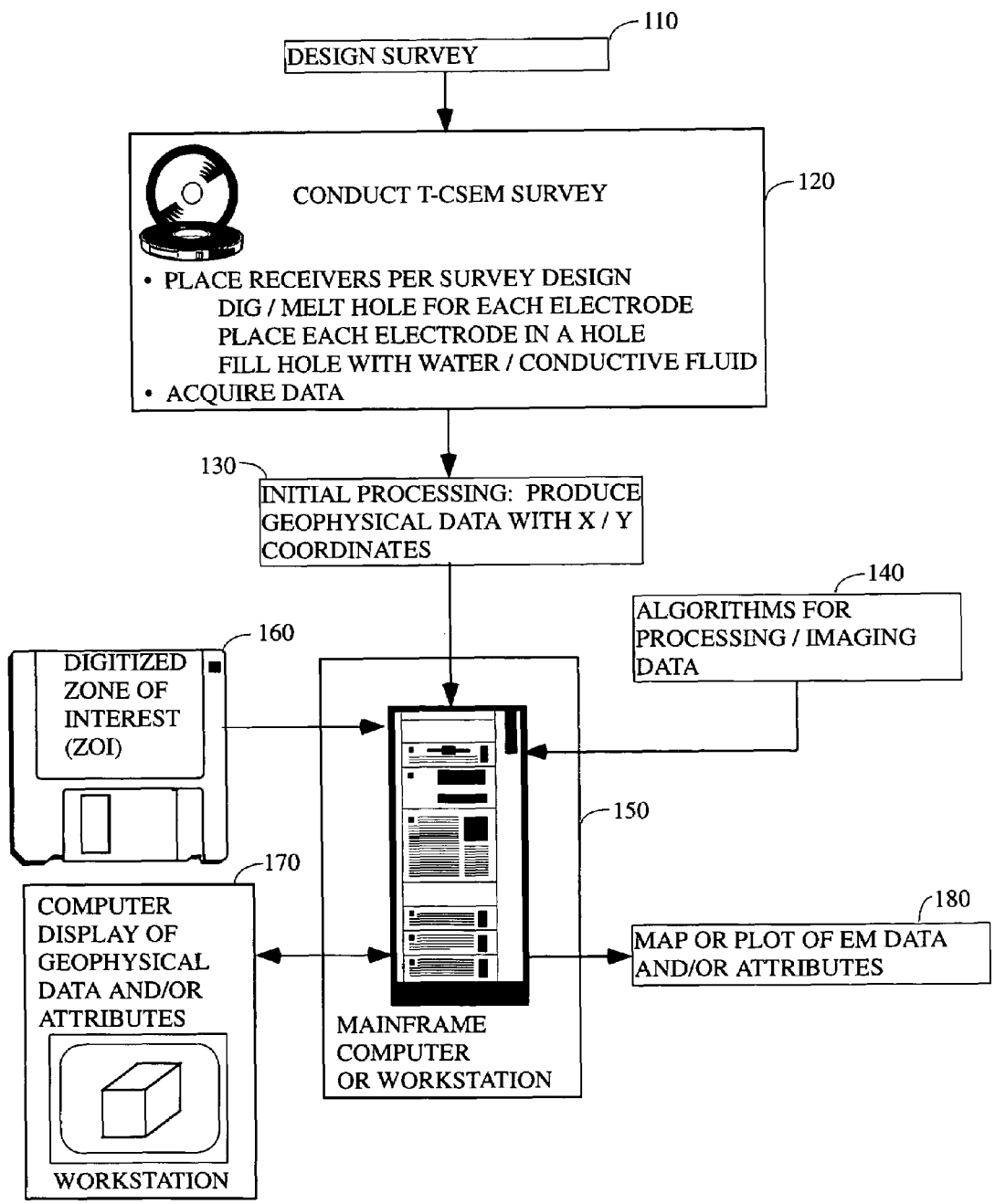
FIG. 1 illustrates the general environment of the instant invention

While this invention is susceptible of being embodied in many different forms, there is shown in the drawings, and will herein be described, some specific embodiments of the instant invention. It should be understood, however, that the present disclosure is to be considered an exemplification of the principles of the invention and is not intended to limit the invention to the specific embodiments or algorithms so described. In particular, although the exemplification is generally given in terms of t-CSEM, those skilled in the art will recognize that, with good coupling of electrodes to the ground, f-CSEM techniques might also be used.

GENERAL ENVIRONMENT OF THE INVENTION

Figure 2:
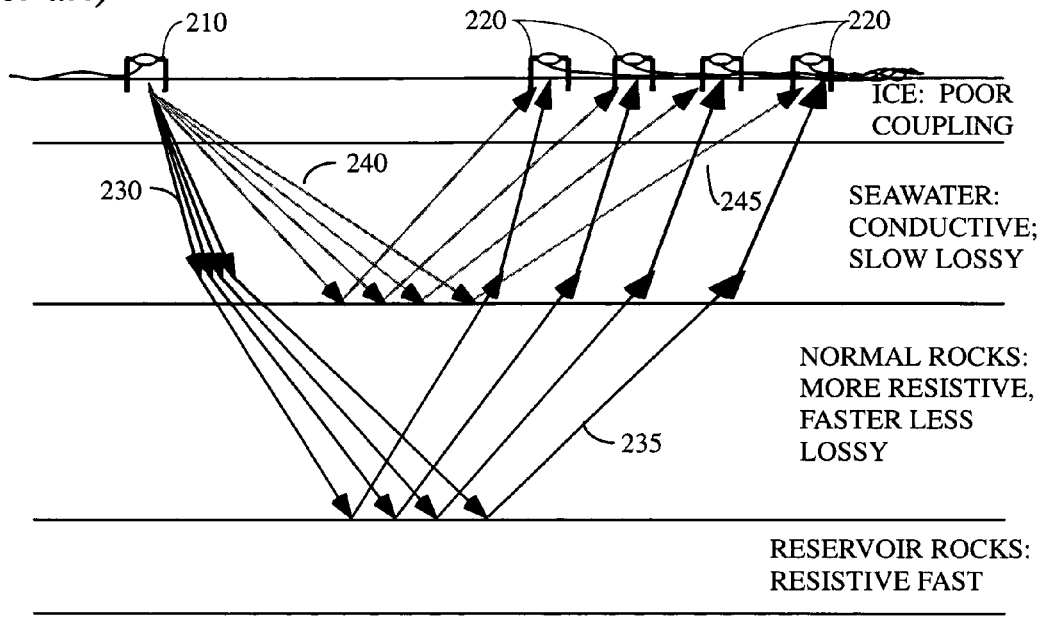
FIG. 2 illustrates a conventional EM survey as it would be conducted on ice or frozen ground.

FIG. 1 illustrates the general environment in which the instant invention would typically be used. As a first step, an EM survey will be designed (step 110), wherein such design would typically include specification of various survey parameters that are designed to define the target and improve the quality of the resulting survey. Among the many parameters that might be considered in formulating the survey design are:

- the surface area to be covered by the survey;
- the time of year that the survey is to be taken, including temperature and ice-cover considerations, as well as natural electromagnetic noise conditions;
- whether the survey will be taken on land (to include ice), offshore, or a combination of the two;
- the depth of the target;
- the 3-D structure of the target (including its 2-D or 3-D dip, if any);
- whether the design will utilize an "end on" configuration (e.g., as is generally indicated in FIG. 2 wherein all of the active receivers are on the same side of the source) or a "split spread" configuration (i.e., as is generally illustrated in FIG. 5 wherein active receivers are placed both ahead of and behind of the source);
- the maximum offset (i.e., the distance from the source 210 to the most distant active receiver 220) and minimum offset (i.e., the distance from the source 210 to the closest active receiver 220);
- the receiver-to-receiver spacing;
- the source-point spacing (i.e., the shot-to-shot spacing, where "shot" is used in the sense of "source activation point");
- the relation between source-points and receiver-points (e.g., sources near to receivers, sources midway between receivers, etc.);
- the frequencies expected in the received data;
- the strength of the sources, and the sensitivity of the receivers, etc.

Of course, the selection of parameters such as the foregoing are design choices that are well within capability of one of ordinary skill in the art. Further, those of ordinary skill in the art will recognize that many of the previous parameters are interrelated (e.g., specification of the target depth determines in a general way a preferred maximum offset).

Next, equipment (including source and receiver electrodes, generators, recording instruments, etc.) will be moved to and set up in the field and an EM survey conducted 120 that is preferably at least approximately in accordance with the original design. Of course, it is certainly possible that some on-site changes will need to be made to the survey as-designed. However, generally speaking the goal of the field crew is to replicate the parameters of the original survey parameter specifications as closely as is possible.

As will be discussed in greater detail hereinafter, one aspect of the survey process that reflects the contribution of the instant inventors involves the way that the source and/or receiver electrodes are coupled to the ice or ground. In brief, in the preferred arrangement each electrode—whether a receiver or a source—will be placed within a hole that has been prepared for that purpose. Preferably, after the electrode is placed therein the hole will be filled with a conductive liquid such as water in advance of data collection, thereby improving the coupling between the electrical component and the earth's surface. Electrodes made of special materials, e.g. lead, may be used to prevent corrosion (as is well known to those skilled in the art).

After preparing the source and receiver electrodes as described above, the data will preferably be collected conventionally depending on the sort of survey that is being taken. Preferably, the survey will be of the t-CSEM variety. However, it is certainly possible that other sorts of EM surveys might be conducted.

As is typical in EM surveys, the source will be activated and the voltage (or an equivalent quantity) will thereafter be measured at each of the receiver electrodes. The response of each receiver to the source will preferably be captured digitally as a function of time and stored on magnetic or other media for transportation to a centralized computing facility where the data will be processed, interpreted, and integrated into other data taken over the same prospect. That being said, in some instances some amount of initial processing 130 will be applied to the data while it is in the field. For example, such in-field processing might be done in order to verify the quality of the data that are being collected. In other instances, the data might be processed to see whether or not the target subsurface rock units are being imaged adequately. In any case, the data will after field processing will usually at least be relatable to specific locations on the surface of the earth.

Although the data that are collected according to the instant invention may be processed to some extent in the field (step 130), eventually it will typically be transferred to a processing center where more computing resources 150 and algorithms 140 are available. In the processing center a variety of processes 140 might be applied to the data to make them ready for use by the explorationist. At some point the processed data traces will likely be stored, by way of example only, on hard disk, magnetic tape, magneto-optical disk, DVD disk, or other mass storage means.

Note that a general purpose computer 150 would typically include, in addition to mainframes and workstations, computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program. In the case of a 3-D geophysical data, the zone of interest 160 would typically include specifics as to the lateral extent and thickness (which might be variable and could be measured in time, depth, frequency, etc.) of a subsurface interval. The exact means by which such zones are created, picked, digitized, stored, and later read during program execution is unimportant to the instant invention and those skilled in the art will recognize that this might be done any number of ways.

The algorithms that are used to process the EM data might be conveyed into the computer 150 by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

After preprocessing, the data may be "imaged" (preferably by utilizing steps such as those described in U.S. Provisional Patent Ser. No. 60/654,378, cited previously). Alternatively or additionally, the data may "inverted" to produce optimal values for a subsurface model defined a priori, following any of a large number of inversion algorithms.

After the EM data has been subjected to the processes discussed herein, the resulting information would typically displayed either at a high-resolution color computer monitor 170 or in hard-copy form as a printed section or a map 180. The geophysical interpreter would then use the displayed images to assist him or her in identifying subsurface features conducive to the generation, migration, or accumulation of hydrocarbons.

PREFERRED EMBODIMENTS

According to a first preferred embodiment, the instant invention is directed toward the application of a novel variant of the standard technique of time-domain Controlled-Source Electromagnetic surveying ("t-CSEM") to the exploration, appraisal, development and surveillance of hydrocarbon reservoirs. In more particular, the instant invention is designed to provide improved source/receiver ground coupling in areas that have heretofore proven to be difficult data acquisition areas. According to one aspect of the instant invention, there is provided a method of improving ground coupling in an EM survey which involves placing each source and/or receiver electrode in a hole that has been drilled (or melted in the case of ice) into the surface. Additionally and preferably, the hole will be at least partially filed with a conductive fluid such as water, thereby improving the coupling between the electrode and the surface in which it is embedded. According to another preferred embodiment there is provided a method for collecting EM data over a body of water that involves waiting until cold weather freezes the water and then taking the survey over ice, with the electrode holes drilled through the ice, into the conductive water below.

Turning first to FIG. 2, wherein the prior art method of collecting EM data over ice and in other difficult data acquisition areas is illustrated, in a conventional arrangement the source 210 and receiver 220 electrodes are placed into contact with the surface by driving metal stakes into ground or ice. As is generally indicated in this figure and as is well known to those of ordinary skill in the art, depending on a number of factors the electrical contact between the stakes and the surface might be of lower quality than would be desired. Factors such as the degree of consolidation, hardness, etc., of the surface of the earth (e.g., the ice in FIG. 2), the depth of penetration of the surface by the stakes, the water content and its state (e.g., liquid or frozen), etc. all can have some bearing on the source 210/220 receiver ground coupling. Of course, poor coupling means that the energy that is transmitted downward from the surface (down going energy 230 and 240) will likely be attenuated and/or corrupted as will be the signal that is subsequently sensed (up-going energy 235 and 245) by the receivers 220.

Figure 3:
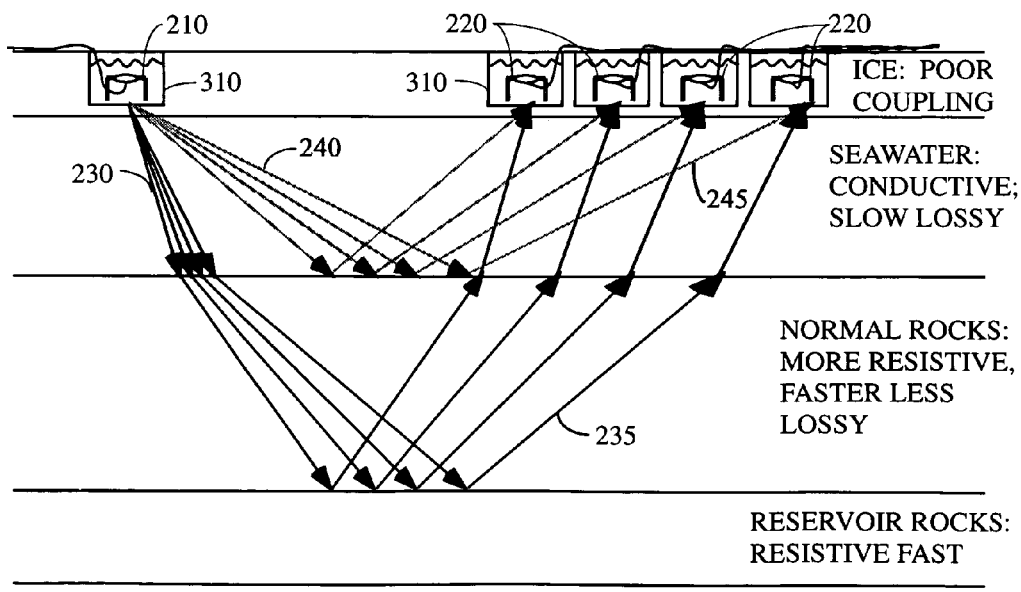
FIG. 3 contains an illustration of an EM survey conducted on ice or frozen ground according to the instant invention.

Turning next to FIG. 3, wherein a schematic illustration of a preferred aspect of the instant invention is presented, the present inventors have discovered that, where the surface of the ground is saturated and frozen (such as in the case of a survey conducted on sea ice, or frozen tundra), the instruments (sources and receivers) may be coupled more faithfully to the ground by drilling or melting holes in the ice (or frozen tundra) by any of a number of methods, and inserting electrodes into the resulting holes. As is generally indicated in FIG. 3, rather than placing the electrodes 210 and 220 on the surface of the, for example, ice, instead a hole 310 will be dug or melted therein. In the preferred arrangement, the hole will have a depth of about at least 2-3 feet, although a deeper hole would likely produce better results (e.g., about ten feet deep). However, those of ordinary skill in the art will recognize that these measurements are only suggestions and the actual depth used in a particular circumstance might be substantially different depending on the ground type, equipment available (e.g., if a drilling rig is available a much deeper hole could be quickly created), etc. Of course, if the survey is conducted over pack ice, its thickness might be only a few tens of feet thick (e.g., 10 to 20 feet thick) and in such a circumstance a drilling rig could punch a hole completely through the ice in short order. In such a circumstance, the source 210 and receiver 220 electrodes could actually be suspended underneath the surface ice if that were desired. In such a circumstance, it would be possible to create a vertically disposed dipole source underneath the ice, in contrast to the horizontal dipoles of the sort utilized in FIG. 5.

Next, and as is generally indicated in FIG. 3, the source 210 and receiver 220 electrodes will be placed in the holes 310 prepared for that purpose. After the electrodes are so positioned, a fluid such as water will be added to the hole. Preferably sufficient fluid will be added as to cover at least the conductive portion of the electrode.

In some preferred embodiment, the water/fluid will be allowed to freeze within the hole 310 if that is possible at the current temperature. That is not required but might be useful in some circumstances.

In the event that water is used, there are two obvious choices: fresh water and salt water. Generally speaking, salt water will generally be preferred for its superior electrical conduction properties (as compared with fresh water). However, since salt water is more corrosive than fresh water, the superior conductivity of salt water must be weighed against the possibility that the electrode (or other components) would have its useful life shortened.

Of course, one immediate consequence of filling the hole with fluid/water is that the coupling between the electrode and the surrounding rock will be greatly enhanced. Further, if the hole 310 that contains the electrode is melted into ice, by allowing the water placed therein to freeze the electrode will be thoroughly integrated into the surrounding ice.

Note that the holes may (or may not) be lined with material to retard the loss of water therefrom. Such lining might be especially desirable when the survey is conducted on land and, for example, where the near surface is relatively unconsolidated (e.g., sandy loam, glacial till, sand, etc.). In such an embodiment, preferably the lining will be at least somewhat impermeable to the passage of water therethrough and somewhat conductive to foster emission of the signal from—or reception by—the electrode.

Upon filling the holes with water (frozen or not, freshwater or salt water, etc.) or other fluid, and connecting the immersed electrodes to the recording instruments, the resulting coupling should be virtually as good as it would be in the case of a marine t-CSEM survey.

After the electrodes are in position within their holes, electrical energy will be injected into them and, subsequently, into the subsurface. As is generally indicated in FIG. 3, the returning signal will then be received (via subsurface propagation paths) at electrodes placed at a range of distances from the source. Of course, it is anticipated that the data so acquired will be subsequently processed, taking into account the reflection of the signal from the bottom of the body of water.

Preferably, the instant method will utilize EM data that have been taken according to CSEM acquisition techniques (and especially t-CSEM and f-CSEM data). That being said, those of ordinary skill in the art will recognize that the other methods of taking EM data could similarly benefit from the increased coupling provided by the instant invention.

According to another aspect of the instant invention, there is provided a method of performing a magnetic survey over a marine survey area which utilizes conventional land-based technology. In the preferred arrangement, the body of water will be allowed to freeze and a surface survey will be thereafter conducted. In more particular, current loops will be deployed over the ice, and received (via subsurface propagation paths) at other current loops similarly deployed, at a range of distances from the sources. Note, as has been described previously, that the basic idea will be to conduct a survey over water without having to employ a towing boat, bottom-placement and recovery of receivers, etc. Instead, a conventional land-based magnetic survey is conducted on top of the ice during cold weather after the surface of the body of water has frozen.

CONCLUSIONS

By way of summary, it should be noted that the instant inventive approach makes it possible for the first time to collect high quality EM data in a marine setting by using modified land techniques after the surface of the water has frozen. Further, the methods taught herein allow higher quality data to be collected in on-shore settings over surfaces that traditionally permit such poor coupling with the electrodes that signal quality is serious degraded.

It should be noted that although the instant invention is well suited for use in connection with CSEM surveys in arctic environments, the same methods could be applied to advantage in more temperate regions as well. That being said, the instant invention is best suited to the exploration, appraisal, development and surveillance of hydrocarbon reservoirs, in the context of a measurement surface covered with ice or snow, including permfrost that extends to the surface or near surface, and further including, for example, the frozen ice-pack of the Arctic, which environments which tend to be under explored for hydrocarbon resources. As such, it should be noted for purposes of the instant disclosure that when the term "surface of the earth" is understood to include both land and marine ice environments. Additionally, the term "marine ice" will be used herein to refer to the ice that has formed over a body of water, whether that body of water is inland or oceanic, salt or fresh.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration within a predetermined volume of the earth containing subsurface structural and stratigraphic features conducive to the generation, migration, accumulation, or presence of hydrocarbons, wherein is provided at least one source electrode and a plurality of receiver electrodes, comprising the steps of:
   a. selecting a survey area above at least a portion of said predetermined volume of the earth, wherein at least a portion of the survey area comprises marine ice;
   b. determining a surface location of each of said at least one source electrode;
   c. determining a surface location of each of said plurality of receiver electrodes;
   d. selecting an electrode from among said at least one source electrode and said plurality of receiver electrodes, said selected electrode having a selected surface location associated therewith, wherein said selected surface location is on the marine ice;
   e. creating at least one hole in the marine ice proximate to said selected surface location, wherein said hole extends through the marine ice and into the water underneath;
   f. lowering said selected electrode into the hole until said selected electrode is in contact with the water beneath said marine ice;
   g. performing steps (d) through (f) at least once;
   h. positioning any of said source or receiver electrodes not previously selected proximate to each source or receiver electrode's determined surface location;
   i. transmitting an electrical signal from said at least one source electrode-to said plurality of receiver electrodes, wherein at least a portion of said electrical signal passes through at least a portion of said predetermined volume of the earth; and
   j. receiving representations of said transmitted electrical signal through said plurality of receiver electrodes, thereby performing a method of geophysical exploration within the predetermined volume of the earth.

2. A method of geophysical exploration according to claim 1, wherein said selected electrode is a source electrode and at least steps (d) through (f) are performed at least twice for two different source electrodes.

3. A method according to claim 1 wherein said transmitted electrical signal of step (i) is a CSEM signal.

4. A method according to claim 1 wherein said selected electrode of step (d) is a source electrode and wherein step (f) comprises the step of:
   (f1) lowering said selected electrode into the hole until said selected electrode is in contact with the water beneath said marine ice, whereby said selected electrode forms a vertically disposed dipole source when so lowered.

5. A method of geophysical exploration within a predetermined volume of the earth containing subsurface structural and stratigraphic features possibly conducive to the generation, migration, accumulation, or presence of hydrocarbons, wherein is provided at least one horizontally disposed source electrode-pair and a plurality of receiver electrode-pairs, comprising the steps of:

a. selecting a survey area above at least a portion of said predetermined volume of the earth, wherein at least a portion of the survey area comprises marine ice;
   b. determining a surface location of each of said at least one horizontal source electrode-pair;
   c. determining a surface location of each of said plurality of receiver electrode-pairs;
   d. selecting an electrode pair from among said at least one horizontal source electrode pair and said plurality of receiver electrode-pairs, said selected electrode-pair having a selected surface location associated therewith, wherein said selected surface location is on the marine ice;
   e. creating at least one hole in the marine ice proximate to said selected surface location, wherein said at least one holes extends through the marine ice and into the water underneath;
   f. lowering each of said selected electrode-pairs into the at least one hole until said selected electrode is in contact with the water beneath said marine ice;
   g. performing steps (d) through (f) at least once;
   h. positioning any of said horizontal source or receiver electrode-pairs not previously selected proximate to each horizontal source or receiver electrode-pair's determined surface location;
   i. transmitting an electrical signal from said at least one horizontal source electrode to said plurality of receiver electrodes, wherein at least a portion of said electrical signal passes through at least a portion of said predetermined volume of the earth; and,
   j. receiving representations of said transmitted electrical signal through said plurality of receiver electrodes, thereby performing a method of geophysical exploration within the predetermined volume of the earth.

6. A method according to claim 5 wherein said transmitted electrical signal of step (i) is a CSEM signal.

7. A method of geophysical exploration according to claim 5, wherein said selected electrode pair is a source electrode pair and at least steps (d) through (f) are performed at least twice for two different source electrode-pairs.

8. A method of geophysical exploration according to claim 5, wherein said transmitted electrical signal of step (i) is a t-CSEM signal.

9. A method of geophysical exploration according to claim 5, wherein said plurality of receiver electrode-pairs are disposed at least approximately along a line on the surface.

* * * * *